United States Patent [19]

McCambridge

[11] Patent Number: 5,446,262
[45] Date of Patent: Aug. 29, 1995

[54] SOLDERING IRON AND SOLDERING IRON TIP WITH SPACED HEATABLE SHELL MEMBER

[75] Inventor: James E. McCambridge, Polo, Ill.

[73] Assignee: Wahl Clipper Corporation, Sterling, Ill.

[21] Appl. No.: 229,535

[22] Filed: Apr. 19, 1994

[51] Int. Cl.⁶ .......................... H05B 3/02; B23K 3/04
[52] U.S. Cl. ................... 219/237; 219/229; 219/230; 228/51
[58] Field of Search .......... 219/221, 227–242; 228/51; 606/29–31

[56] References Cited

U.S. PATENT DOCUMENTS

| | | |
|---|---|---|
| 2,709,743 | 5/1955 | Mitchell . |
| 2,714,651 | 8/1955 | Wotton . |
| 2,973,422 | 2/1961 | Smith . |
| 3,141,087 | 7/1964 | Schoenwald . |
| 3,141,956 | 7/1964 | Schoenwald . |
| 3,234,356 | 2/1966 | Babb . |
| 3,419,704 | 12/1968 | Hunt . |
| 3,461,874 | 8/1969 | Martinez . |
| 3,513,290 | 5/1970 | Burley et al. . |
| 3,691,342 | 9/1972 | Giles et al. . |
| 3,886,944 | 6/1975 | Jamshidi . |
| 3,899,654 | 8/1975 | Walton . |
| 3,984,655 | 10/1976 | Wahl ................... 219/233 |
| 4,064,447 | 12/1977 | Edgell et al. . |

FOREIGN PATENT DOCUMENTS

| | | |
|---|---|---|
| 897721 | 3/1945 | France . |
| 640602 | 7/1950 | France . |
| 983860 | 6/1951 | France . |
| 585796 | 10/1933 | Germany . |
| 855798 | 12/1960 | Hungary . |
| 454174 | 6/1950 | Italy . |
| 462004 | 2/1951 | Italy . |
| 519756 | 4/1955 | Italy . |
| 505505 | 6/1938 | United Kingdom . |
| 1185558 | 4/1968 | United Kingdom . |

*Primary Examiner*—John A. Jeffery
*Attorney, Agent, or Firm*—Greer, Burns & Crain, Ltd.

[57] ABSTRACT

A soldering iron includes a handle, a power source such as a rechargeable battery in the handle, and two electrical terminals connected to the battery through a switch; a soldering iron tip is secured to the terminals and includes a pair of electrical leads, and a wire heating element connected to the leads and encapsulated in a ceramic filled shell, wherein the tip has relatively low mass and a relatively high resistance heating element, and in battery operated irons can produce about 520 solder joints per battery charge.

7 Claims, 1 Drawing Sheet

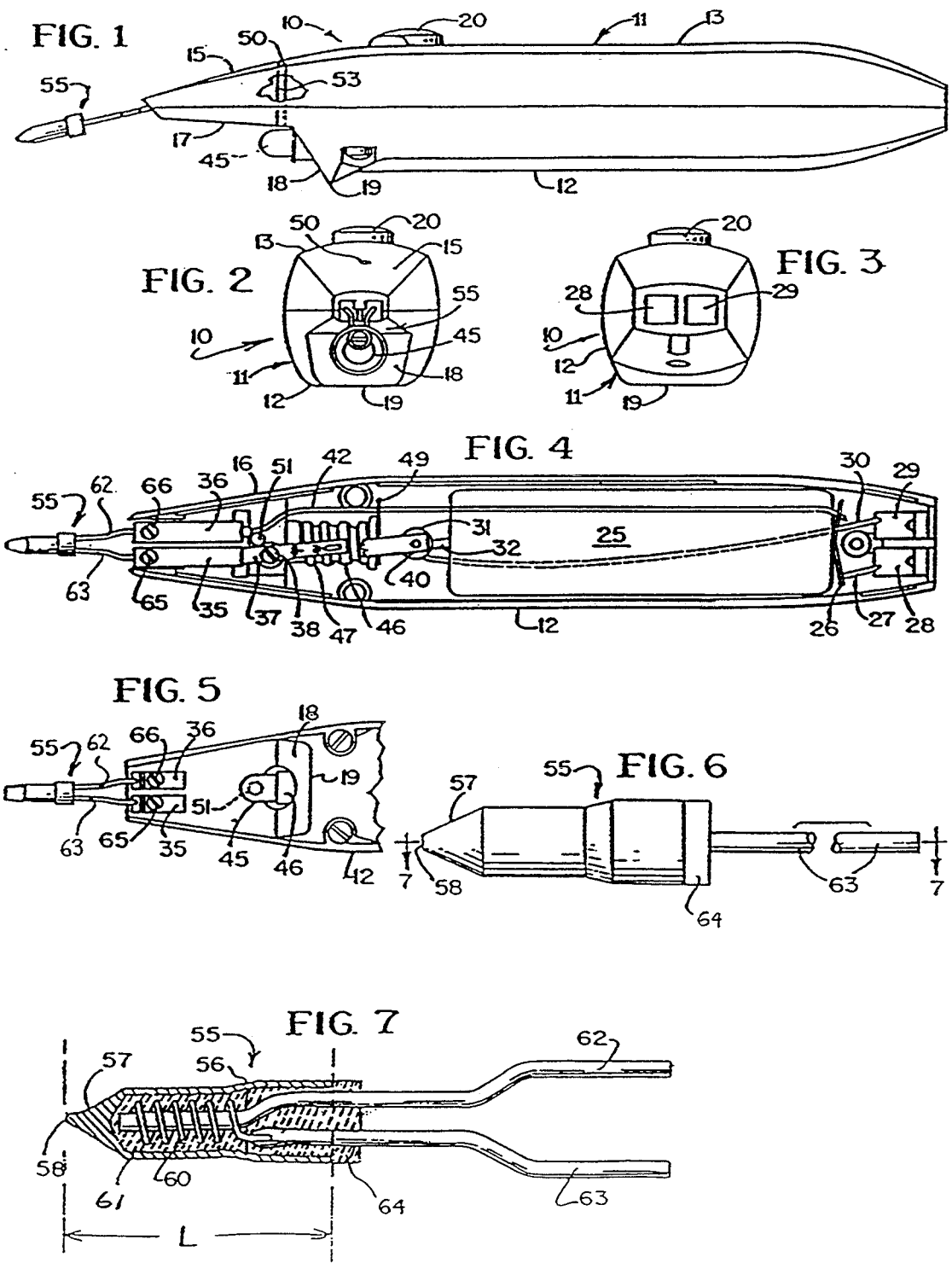

SOLDERING IRON AND SOLDERING IRON TIP WITH SPACED HEATABLE SHELL MEMBER

This invention relates to soldering irons and soldering iron tips, and more particularly, to cordless soldering irons and tips for soldering irons having improved efficiency and longer battery life when a battery is used.

U.S. Pat. No. 3,899,654 is incorporated by reference in its entirety. U.S. Pat. No. 3,899,654 describes a soldering iron and tip which are adapted for use with rechargeable batteries. According to U.S. Pat. No. 3,899,654, up to 60 solder joints could be made per battery charge, using batteries which were commercially available at that time. More recently, battery technology has improved enough that the devices described in U.S. Pat. No. 3,899,654 now provide up to about 370 solder joints per battery charge.

One commercial tip made according to U.S. Pat. No. 3,899,654 had a shell length of about 0.800 inch, and a shell weight of about 1.0 grams. The internal volume of the shell was about 0.008 cubic inch, and the total tip weight was about 1.7 grams. The heating element inside the tip was commonly known as Balco wire, and had a resistance of about 0.12 ohms at room temperature, and about 0.31 ohms when the temperature of the outside of the shell was about 500° F. At start-up, the tip drew current of about a 6.7 amps. The tip dissipated about 12.6 watts after 10 seconds, about 10.7 watts after 30 seconds, and about 9.3 watts after 60 seconds. The tip reached a temperature of 500° F. on the outside of the shell after about 23 seconds. The iron had a continuous run time of about 21 minutes.

Notwithstanding the performance of the previously patented device with the improved batteries, there remains a need for more efficient devices, including rechargeable soldering irons which yield a higher number of solder joints per battery charge. While more solder joints could be obtained by increasing battery power, that solution is less desirable because it would add to the size, weight and cost of the device.

Accordingly, one object of this invention is to provide new and improved soldering irons and tips.

Another object is to provide new and improved battery powered soldering irons and tips which can produce more solder joints per battery charge, without significantly increasing the size or weight of the device.

Yet another object is to provide new and improved battery powered soldering irons and tips which can produce up to about 520 solder joints per charge.

SUMMARY OF THE INVENTION

In accordance with one aspect of this invention, a soldering iron includes a handle, a power source such as ordinary line voltage, low voltage generated from line voltage or a battery in the handle. Two electrical terminals are connected to the battery or other power source through a switch.

A soldering iron tip is secured to the terminals. The tip includes a pair of electrical leads, and a wire heating element connected to the leads. The heating element is encapsulated in a ceramic filled shell. The tip has relatively low mass and a relatively high resistance heating element, and battery powered units can produce up to about 520 solder joints per battery charge.

BRIEF DESCRIPTION OF THE DRAWINGS

FIG. 1 is a side elevational view, partly broken away, of a cordless soldering iron embodying the invention;

FIG. 2 is a front elevational view of the cordless soldering iron shown in FIG. 1;

FIG. 3 is a rear elevational view thereof;

FIG. 4 is a top plan view of the cordless soldering iron of FIG. 1, the upper housing portion being removed to expose the components within the housing;

FIG. 5 is a fragmentary bottom view of the cordless soldering iron of FIG. 1 showing details of the invention;

FIG. 6 is an enlarged view of the tip assembly of the invention;

FIG. 7 is a sectional view through the tip assembly on line 7—7 of FIG. 6.

DESCRIPTION OF THE PREFERRED EMBODIMENT

Referring to FIGS. 1-3 of the drawings, a cordless soldering iron 10, which will be described first, includes an elongated housing 11 of insulating material having lower housing portion 12 and upper housing portion 13.

As shown, upper housing portion 13 tapers at its forward end toward the housing axis as shown at 15, both horizontally and vertically. Lower housing portion 12 at its forward end also tapers horizontally toward the housing axis as shown at 16 in FIG. 4, and in the forward region at the bottom is provided with a recess as shown at 17 in FIG. 1.

Still referring to FIG. 1, rear wall 18 of recess 17 inclines rearwardly and terminates at its lower end in a transverse straight foot 19, also shown in FIGS. 2, 3 and 5, which imparts stability when the soldering iron is rested on a flat surface.

A pushbutton 20 (FIGS. 1-3) is mounted forwardly in the top of upper housing portion 13. It cooperates with switch members mounted within housing 11, and is biased by one of the members to open switch position, as will be seen.

Referring to FIG. 4, lower housing portion 12 contains rearwardly disposed rechargeable battery means 25, for example, a pair of nickel cadmium batteries encased in a plastic shell providing a nominal voltage of 2.4 volts and 1.8 ampere hours. Such batteries possess long life, and are rechargeable from "dead" to "full charge" in about 4 hours at a safe charging rate. Rear terminal 26 of battery means 25 is connected by conductor 27 to external terminal 28 which, together with adjacent external terminal 29, constitute connections for an associated battery charger (not shown). External terminal 29 is connected by conductor 30 to stationary switch element 31 which in turn is connected to front terminal 32 of battery means 25.

Other power sources could be used, such as ordinary line voltage or low voltage provided from line voltage through a transformer. Power can be supplied through the housing or from outside of the housing. A power switch could also be provided outside of the housing, if desired, such as on a low voltage output transformer.

Still referring to FIG. 4, a pair of spaced terminals 35 and 36 are mounted in recesses provided in the forward end of lower housing portion 12. Terminal 35, as shown, has connected thereto a spring strip 37 (shown broken away) which is secured for stability to a boss projecting from the bottom of housing portion 12 by a screw 38. The free end 40 of spring strip 37 constitutes a movable switch element which normally is spaced from previously mentioned stationary switch element 31. Pushbutton 20 is in effective relation with free end 40 of spring strip 37, so that when button 20 is depressed the switch closes, and when released the switch opens.

Companion forward terminal 36, as shown, is received loosely in a cooperating recess in lower housing portion 12, and is held in place by upper housing portion 13 when the two housing portions are in assembled relation. A conductor 42 connects terminal 36 to rear terminal 26 of battery means 25. Thus, when switch elements 31 and 40 are closed, terminals 35 and 36 are in circuit with battery means 25.

The illustrated embodiment of the invention includes a lamp 45 (FIGS. 1, 2 and 5) mounted in rear wall 18 of recess 17 and directed forwardly of housing 11. As will be seen, lamp 45 directs a beam of light to work being acted upon by the soldering tip presently to be described. Lamp 45 is received in metallic lamp socket 46 (FIG. 4) which is connected electrically to spring strip 37 by conductor 47 secured by screw 38 in contacting relation with the socket. A conductor 49 extends between conductor 42 and the insulated rear end of socket 46 which engages the central terminal of lamp 45. Thus, lamp 45 is connected in shunt with forward terminals 35 and 36 in circuit with switch elements 31 and 40.

Lamp 45 normally is located on the under side of the soldering iron during use, and the off-on condition thereof may not be observable by the operator, particularly under daylight conditions. In order that the operator readily may be informed as to the off-on conduction of the lamp, an indicator or signal may be provided on the top of the soldering iron forwardly of pushbutton 20. This indicator includes aligned apertures 50 (FIG. 1) and 51 (FIGS. 4 and 5) in the upper and lower housing portions 13 and 12, respectively, and an elongated light transmitting member 53 (FIG. 1) terminating at its ends in the apertures. Lower aperture 51 is adjacent lamp 45, whereby light from the lamp is transmitted to upper aperture 50 where it is readily visible to the operator. The luminous intensity of lamp 45 and hence the intensity of the signal in upper aperture 50 are functions of the charge condition of the battery means, and, accordingly, the lamp and indicator tell the operator at least in a general way whether or not the battery means requires recharging, as well as the off-on condition.

A tip assembly generally designated 55 is secured, preferably in detachable manner, to forward terminals 35 and 36. Tip assembly 55 is best shown in enlarged FIGS. 6 and 7.

Referring to FIG. 7, tip assembly 55 comprises an elongated heatable metallic member or shell 56. As shown, member 56 is hollow and closed at its free end 57 which is tapered both laterally and vertically to provide a soldering tip 58 of convenient size and shape. Alternatively, tip 58 may be part of a separate member having telescoping relation with the shell 56.

A heating element 60, preferably a coil, of resistance material is positioned within member 56 and electrically insulated therefrom by means such as material 61 to the extent necessary to prevent a short circuit across the element. Insulating material 61, if used, has high heat conductivity, and it has been found that ceramic potting material is especially satisfactory.

A pair of electrical conductors 62 and 63 of relatively high electrical conductivity (low resistance) and low heat conductivity extend between the ends of element 60 and terminals 35 and 36, and one or both of them serve as the sole support for element 60 and associated member 56. As shown, the forward ends of terminals 35 and 36 contain openings of suitable size to receive the free ends of conductors 62 and 63, and set screws 65 and 66 (FIGS. 4 and 5) are provided to secure the conductors in the terminals in detachable manner.

While it is preferred that one or both of the electrical conductors 62 and 63 provide the sole support for heating element 60 and associated tip member 56, as illustrated, the invention contemplates that the material 61 also performs some or all of the supporting function. Such material is ceramic or other suitable nonelectrically conducting material which transfers heat well. Thus, in broadest aspect, the tip assembly invention contemplates means, including a pair of electrical contacts, for supporting the heating element and member from, and in spaced relation with, the housing and for energizing the element. This supporting and energizing means, of course, has a transverse cross-sectional area.

A ceramic cap 64 may be used for assembly purposes, and to further support the shell member 56. During assembly, the cap 64 holds the conductors 62 and 63 in spaced relationship while the heating element is welded or otherwise securely connected to the conductors. When the shell 56 is filled with molten ceramic 61 and the heating element 60 is inserted into the shell, the cap 65 holds the heating element and conductors properly while the ceramic sets, avoiding electrical short circuits in the tip assembly.

The aforesaid transverse cross-sectional area in some instances may vary along the length of the supporting and energizing means, as would be the case, for example, with a tubular member (not shown) having one or more circumferential grooves used either as a separate support part or as one of the conductors. When a variation in cross-sectional area exists, the cross-sectional area critical to the invention is the minimum cross-sectional area because minimum area mainly controls the amount of heat conducted through the supporting and energizing means to the housing. Such heat, of course, is unavailable for soldering, and thus is a loss resulting in electrical inefficiency.

It has been found that the electrically high efficiency characteristic of the present tip assembly is due in most part to the construction of the tip. By decreasing the mass of known tips, and increasing the resistance of the heating elements, efficiency is significantly improved, and the number of joints which can be obtained with a single battery charge is increased to about 520. Satisfactory results have been obtained by reducing the total tip weight to about 1.35 grams or less, reducing the weight of the shell member 56 to about 0.75 grams or less, reducing the length L to about 0.55 inch or less, and lowering the internal volume of the shell (excluding internal elements) to about 0.06 cubic inch or less. This produces a total tip weight of about 1.35 grams. The heating element is selected to have a resistance of about 0.19 ohms at room temperature, and about 0.52 ohms when the shell is heated to about 500° F. With these parameters, the tip draws about 5.7 amps at start-up, and dissipates to about 10.3 watts after 10 seconds, 8.9 watts after 30 seconds, and 7.1 watts after 60 seconds.

Electrical conductors 62 and 63 may be formed of spring wire of diameter in the range of 0.035 to 0.040 inch, with the length of the conductors such that they space shell member 56 about 0.6 inch from the housing. It further has been found that at least one of the electrical conductors 62 and 63 should be formed of material that has a heat conductance of less than one-half that of copper.

As shown, conductors 62 and 63 as well as the entire tip assembly 55 preferably extend at a small angle to the axis of housing 11. This geometrical relationship places soldering tip 58 in the beam from lamp 45, insuring simultaneous illumination of the tip and the critical portion of the work. Also, this angulation of the tip assembly contributes greatly to ease of operation.

The exterior of member 56 of tip assembly 55, except in the immediate vicinity of soldering tip 58, may be coated with electrical and thermal insulating material (not shown) for the purpose of minimizing heat loss by radiation and conduction, and minimizing short circuits in the work. The latter is a safety factor particularly when using the soldering iron on printed circuit boards and the like.

The illustrated cordless soldering iron embodying the invention may be less than 8 inches long, including tip assembly, and may weigh less than 6 ounces. It is designed for "good feel" and balance, factors tending to eliminate fatigue during extended usage. The outside of the soldering shell reaches about 500° F. in about 10 seconds, and the iron is capable of soldering up to 520 joints per charge depending on joint size. The continuous run time of the iron is about 29 minutes.

The many advantages of the present invention are now apparent. Battery life per charge is increased by about 30%, without reducing tip temperature, and more solder joints can be made per charge of the batteries.

From the above description it is thought that the construction and advantages of this invention will be readily apparent to those skilled in the art. Various changes in detail may be made without departing from the spirit or losing the advantages of the invention.

I claim:

1. An electrically and thermally highly efficient soldering iron, comprising:
    a housing having a forward end;
    a heatable shell member adapted to be supported in spaced relation with the forward end of said housing, said shell member having a weight of about 0.75 grams or less;
    a heating element of resistance wire within said shell member in effective heating relation therewith and electrically insulated therefrom, said element having resistance at room temperature of about 0.19 ohms, and a resistance of about 0.52 ohms when the outside of said shell is heated to about 500° F.;
    means for providing electrical power to said heating element; and
    a pair of electrical conductors of deformable solid wire connected between said heating element and said power means for energizing said element and for solely supporting said element and said shell member in spaced relation to the forward end of said housing.

2. The soldering iron of claim 1 wherein said power means includes a rechargeable battery means in said housing,
    a pair of terminals electrically insulated from each other mounted at the forward end of said housing and connected to said battery means, and
    a switch in said housing in circuit with said battery means and said terminals.

3. The soldering iron of claim 2 wherein said iron has a continuous run time of about 29 minutes.

4. The soldering iron of claim 1 wherein said shell member is hollow and is filled with an electrical insulator, said insulator encapsulating said heating element and a portion of said conductors.

5. The soldering iron of claim 4 wherein said insulator comprises a ceramic material.

6. The soldering iron of claim 1 wherein said shell has a length of about 0.55 inch or less, and an internal volume of about 0.06 cubic inch or less.

7. The soldering iron of claim 1 wherein the outside of said shell heats to about 500° F. in about 19 seconds.

* * * * *